Figure 1:
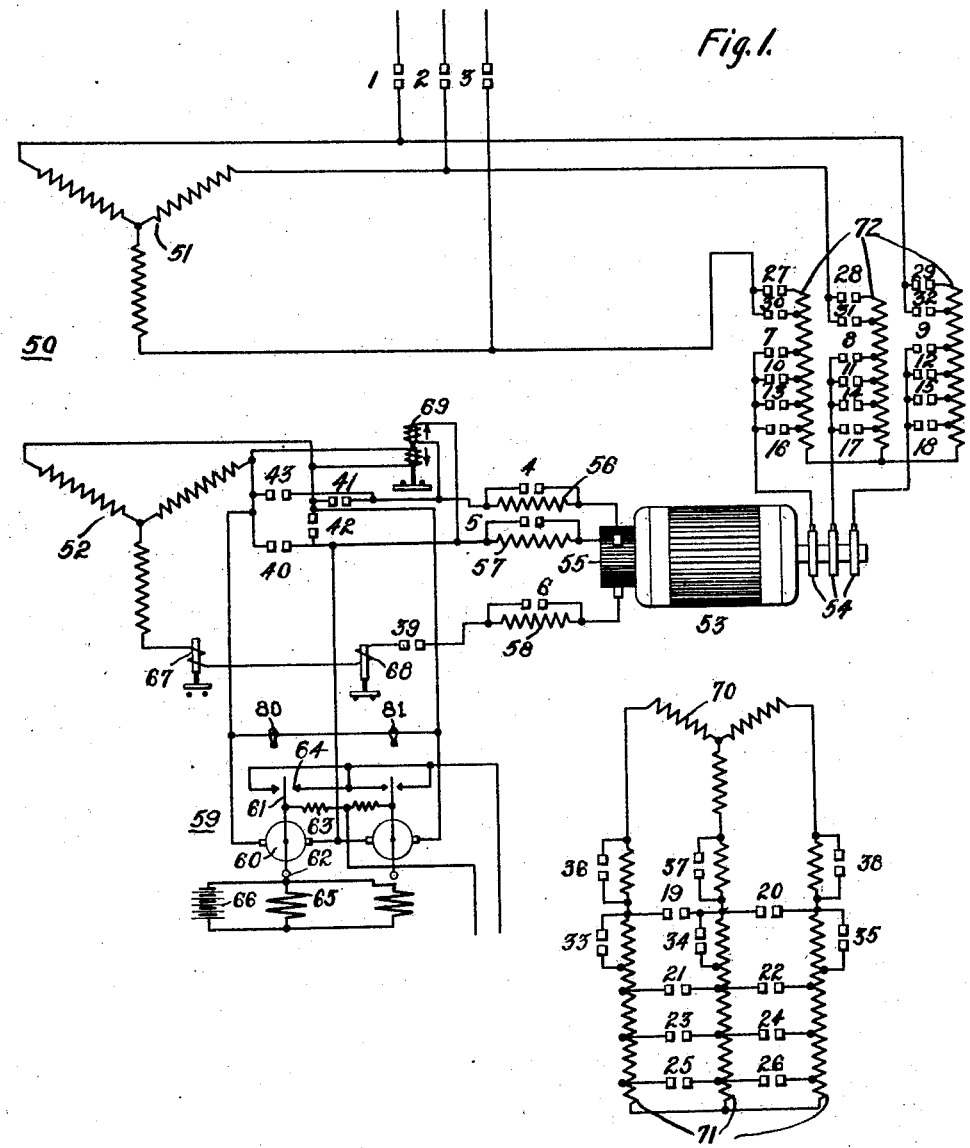

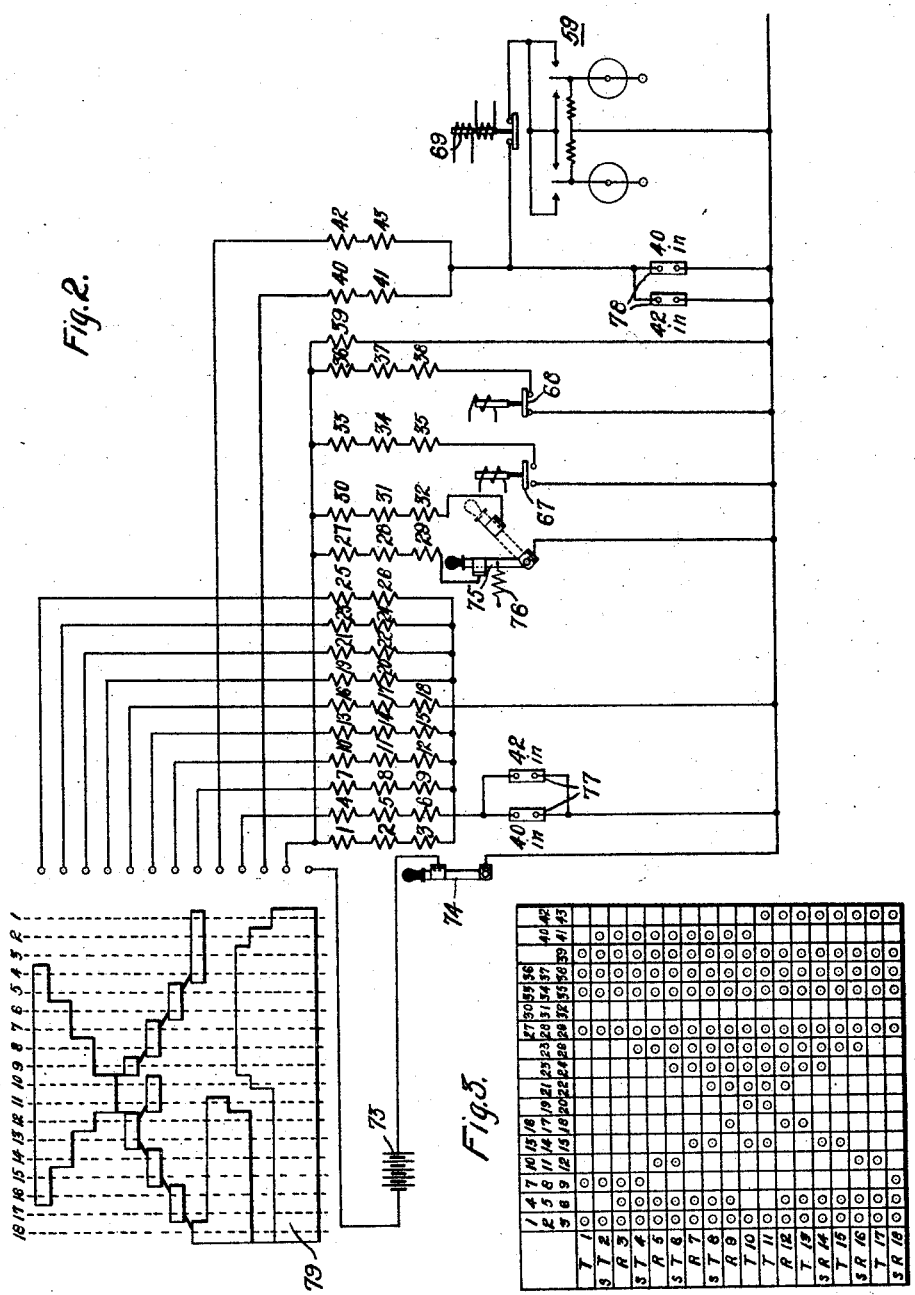

UNITED STATES PATENT OFFICE.

RUDOLF E. HELLMUND AND HERBERT G. JUNGK, OF SWISSVALE, PENNSYLVANIA, ASSIGNORS TO WESTINGHOUSE ELECTRIC & MANUFACTURING COMPANY, A CORPORATION OF PENNSYLVANIA.

SYSTEM OF SPEED CONTROL FOR INDUCTION MOTORS.

1,417,735.     Specification of Letters Patent.     Patented May 30, 1922.

Application filed August 26, 1918, Serial No. 251,385. Renewed April 13, 1922. Serial No. 552,219.

*To all whom it may concern:*

Be it known that we, RUDOLF E. HELLMUND, a citizen of the German Empire, and a resident of Swissvale, in the county of Allegheny and State of Pennsylvania, and HERBERT G. JUNGK, a citizen of the United States, and a resident of Swissvale, in the county of Allegheny and State of Pennsylvania, have invented a new and useful Improvement in Systems of Speed Control for Induction Motors, of which the following is a specification.

Our invention relates to the control of induction motors and particularly the control of induction motors in which the secondaries are connected to a frequency changer and are regulated thereby.

We have established the fact that certain conditions of operation of induction motors of the above character will lead to instability unless counteracting influences are associated with said induction motors to offset the unstabilizing influences, as will be pointed out more in detail hereinafter. Our invention, therefore, contemplates the arrangement of a system of control and interlocking whereby induction motors of the above-described character may be accelerated to any desired speed with the most efficient operation. To this end, we have provided means, associated with the regulating frequency changer machine and the induction motor to be controlled, whereby certain predetermined conditions must exist before the two can be connected.

We have discovered that when the frequency changer is connected to the motor secondary, care must be taken that the frequency changer voltage is larger than, or at least not much smaller than, the secondary motor voltage and have, therefore, provided means to insure the existence of this relation before the two members above referred to are connected together. This frequency-changer voltage may be affected by the brush friction varying and the subsequent change in speed of said machines. In addition to this relation, it is necessary, in order to maintain the stability of operation, that the frequency-changer current be kept above a certain value, while, to avoid overheating, it should be below a certain value, and these conditions we have also provided for by the use of appropriate low and high-current relays.

Again, we have discovered that, in going through synchronous speed, highly efficient operation may be obtained by raising the voltage of the frequency changer at this period of operation and, at the same time, inserting current-limiting resistance devices between the frequency changer and the motor to be regulated. Said current-limiting resistance devices have been found highly desirable whenever said two machines are connected to each other, whether at starting, or after a period of coasting or in changing from under-synchronous to over-synchronous speeds, and we have devised means for effecting this desired result.

Finally, it has been found very desirable, in going from one running position of the accelerating controller to another, to change first the resistance which is connected to the stator of the frequency changer, and thereafter to change the primary voltage of the frequency changer, this novel sequence of events contributing greatly to efficient operation.

In the accompanying drawings, Fig. 1 shows the system of connections used in accordance with our invention; Fig. 2 is an auxiliary diagram of the switch connections, showing the manner in which the switches are operated by the master controller; and Fig. 3 is a switching sequence chart illustrating the position of the various switches shown in Fig. 1.

Referring now more particularly to Fig. 1, an induction motor 50, having a primary winding 51 and a secondary winding 52, is shown. A frequency changer 53, provided with slip rings 54 and a commutator 55, is inserted between the source of supply and the secondary winding of the induction motor, said frequency changer and induction motor forming what may be termed a control-aggregate.

For a detailed description of the type of frequency changer illustrated, reference may be had to U. S. Patent No. 1,235,583, issued August 7, 1917, to the Westinghouse Electric & Manufacturing Company, on an application filed by F. W. Meyer.

Resistance devices 56, 57 and 58 are inserted between the commutator end of the frequency changer and the induction-motor secondary 52 for purposes to be hereinafter described, and are so arranged that they may be short-circuited by switches 4, 5 and 6.

A synchronizing device 59, here shown in duplicate for purposes of reverse operation, is likewise placed between the frequency changer 53 and the induction-motor secondary 52. Since the two synchronizing devices are similar, one only will be described. The synchronizing device 59 comprises an armature 60 having a lever 61 attached to its shaft, and a weight 62 secured to the lower end of the lever to normally maintain the same in an upright position midway between contact points 64, a flexible lead 63 being connected to the upper end of the lever 61. A field winding 65, which may be excited by direct current from any suitable source, such, for instance, as a battery 66, is provided for purposes of excitation.

As long as the machines are not in relative synchronism, the alternating current which passes through the armature 60 will be subject to beats, or periodic changes in amplitude. This will cause the armature lever 61 to oscillate, with the alternations, between the contact points 64. It will be understood, however, that the lever 61 will not oscillate far enough to touch the contact points 64, except during the peaks of the beats, and that the magnets 40 to 43, which are controlled by the lever 61 and contacts 64, as hereinafter pointed out, are so designed that they will respond only when the consecutive impulses created by the contacts are sufficiently prolonged, or, in other words, when the beats are sufficiently slow. The magnets 40 to 43 actuate the correspondingly numbered switches which close the circuit between the two machines, as will be pointed out hereafter. It will be understood that any improved type of synchronizing device may be substituted for the device 59, the latter being shown for purposes of illustration merely.

A low-current relay 67 and a high-current relay 68 are shown as controlled by the current passing from the frequency changer 53 to the motor secondary 52, while a differential-voltage relay 69 is similarly controlled by the voltages of the induction-motor secondary 52 and of the frequency changer 53.

The frequency changer 53 is provided with a phase-wound stator member 70 in each branch of which are inserted resistance members 71, as shown.

A star-connected, three-phase auto-transformer 72 is placed between the frequency changer and its source of supply.

Switches 1, 2 and 3 serve to connect the control aggregate to the source of supply (not shown). Switches 7 to 18, inclusive, are employed to adjust the three-phase auto-transformer 72 which is inserted between the slip rings 54 of the frequency changer 53 and the source of supply therefor. In order to change the number of turns of this transformer, switches 27 to 32 are employed. The resistance devices inserted in the stator member 70 of the frequency changer 53 are controlled by switches 19 to 26, inclusive, and 33 to 38, inclusive. In order to provide for connection between the commutator end of the frequency changer 53 and the secondary member 52 and, at the same time, to provide for reversal of the phase-relationship of the frequency-changer voltage upon the induction motor passing through synchronism, switches 39 to 43 are provided.

Any well-known means may be used for initially accelerating the motor, and no means for this purpose are, therefore, illustrated.

Fig. 2 illustrates the connections necessary for the proper excitation of the actuating coils of each of the switches in order to accelerate the motor up to 200% synchronous speed. A battery 73 supplies energy for the actuation of the various operating coils which are, in this figure, numbered similarly to their associated switches in Fig. 1. A master switch 74 is provided in order that, when desired, the entire bank of switches may be deprived of their operating force, a condition which is desirable, for instance, during the coasting operation. In connection with switches 4 to 6, inclusive, and 40 to 43, inclusive, interlocks 77 and 78 are shown, the purposes of which are to be hereinafter described, and a double-throw switch 75 is provided in order that either switches 27 to 29, inclusive, or 30 to 32, inclusive, may be actuated. It is held in its normal position, namely, that position in which switches 27 to 29, inclusive, are energized, by a spring 76.

A master controller 79 is shown whereby the hereinafter described switching steps are performed.

In Fig. 3, the switching sequence necessary to obtain the adequate acceleration of a motor in accordance with our invention is shown.

Having now described a system of connections whereby an induction motor may be controlled in accordance with our invention, the operation thereof is as follows: The switch 74 being first closed, the entire bank of switches is connected by one of their terminals to the battery 73.

Then the master controller is moved to the right to the first position and the switches 1, 2 and 3 are closed and voltage is thereby impressed upon both the induction motor and the frequency changer. At the same time, switches 7, 8 and 9 place in circuit the highest frequency-changer transformer voltage taps, while switches 27, 28 and 29 are likewise closed. A circuit is also completed through the actuating coils of switches 33 to 35 and 36 to 38, through low and high-current relays 67 and 68, respectively, said current relays being both in their "down" position by reason of the fact that current cannot flow therethrough while switch 39 is open.

If the controller is now moved to its second position, switch 39 will be closed, and one terminal of the switch magnets 40 and 41 will be connected to the battery 73. The other terminal of said magnets is connected to the battery through the voltage relay 69 and the synchronizing device 59. The latter will prevent the actuation of the switches 40 and 41 unless the motor 50 and frequency changer 53 are substantially in synchronism with each other. However, before the circuit is completed between the frequency changer and the induction-motor secondary, it is necessary that the correct voltage relations exist, namely, that the voltage is higher on the frequency changer than on the induction-motor secondary.

Unless this desired relation exists, the voltage relay 69 will not be in the raised position and, although the synchronizing switches have closed, there will still exist an open circuit because the relay 69 is in its lower position. Under these circumstances, the switch 75 should be moved to the right against the action of the spring 76 to cause the switches 30 to 32, inclusive, to close, whereby the secondary voltage of the transformer will be raised sufficiently to give the desired increase of voltage and the relay 69 will be raised and a circuit completed through switches 40 and 41 and the synchronizing switches. In practice, the most feasible design for a switch of this character would be that of a push-button, of such a character that, when the proper voltage ratio does not exist, this push-button switch could be actuated to close switches 30 to 32, inclusive, and, while we have shown the switch 73 as of the spring-controlled type, we wish it to be understood that any other desirable design of spring switch may be used.

After the above described operation of synchronizing and voltage raising has been accomplished, it is desirable that the entire apparatus whereby this was accomplished may be removed from circuit and we have therefore provided the interlocks 78, as shown, which, when switch 40 or 42 is in closed position, will so change the connections that a circuit will be completed without the synchronizing device 59 being contained therein. It will be observed, in Fig. 3, that we have indicated the switches 30 to 32, inclusive, as in open position throughout the operation of the controller. It will be understood, however, that the choice between these switches and the switches 27 to 29, inclusive, is governed entirely by the voltage relation existing between the two machines, and either set may be used, at will, by the operation of the switch 75.

In the remainder of the positions of the master controller, it will be observed, by reference to the sequence chart, that the motor is accelerated, in a well-known manner, up to substantially 200% synchronous speed. A novel feature, however, which will be observed in this connection, is the practice of first changing the frequency-changer resistance, which tends to change the frequency, and then changing the frequency-changer voltage, during the acceleration of the motor. Moreover, it will be observed that the resistance devices 56, 57 and 58 are always in circuit whenever the two machines are disconnected from each other, thereby limiting, to a great degree, the excessive current which may tend to flow when the connecting switches 40 or 42 are closed. The interlocks 77 are so associated with the switches 4, 5 and 6 governing the resistance devices 56, 57 and 58 that the resistance devices cannot be short-circuited unless the switch 40 or the switch 42 is in closed position.

As has been hereinbefore described, it is further necessary that a predetermined current, within certain limits, be maintained between the frequency changer and the induction motor secondary after the two have been synchronized and are running in the normal manner.

Referring again to Fig. 2, it will be observed that the low and high-current relays 67 and 68, respectively, control the circuits in which the switches 33 to 35, inclusive, and 36 to 38, inclusive, are placed. If, therefore, during the operation of the machines, the current falls below that value which it is desired to maintain, the relay 67 will close the circuit between the energizing battery 71 and the switches 33 to 35, inclusive, whereupon those switches will close and the resistance devices which they short-circuit in the stator member 70 of the frequency changer 53 will be removed and an increased current will thereafter pass between the frequency changer and the induction motor secondary.

If, on the other hand, the current rises above a predetermined value, the relay 68 will be drawn upwardly and the circuit in which the coils 36 to 38, inclusive, are placed will be opened and this circuit change will, in turn, cause the associated switches 36 to 38, inclusive, to open, whereupon additional resistance will be placed in the stator circuit 70 of the frequency changer thus causing a diminution of the current flow between the two machines.

When coasting is desirable, the switch 74 is first opened and then the controller may be either left where it is or be moved backwardly to zero. When it is desired to again operate with power, the switch 74 is closed and the controller moved slowly around until the position at which the machines are in synchronism with each other is reached. For this purpose, we have provided two synchronizing lamps 80 and 81 through the observation of which the operator may be reasonably sure that he is in the vicinity of correct synchronizing speed. Assurance that the switches will close under proper condition is, however, again secured by devices 59 and 69, as previously described. In Fig. 3, the "running" positions of the controller are designated R, the "transition" positions T, and the positions at which the two machines may be brought into relative synchronism are designated S.

While we have shown but one embodiment of our invention, it is obvious that many changes may be made therein by those skilled in the art, and we desire, therefore, to be limited only by the prior art or the scope of the appended claims.

We claim as our invention:

1. In a system of control, the combination with an induction motor, comprising a primary and a secondary, of a regulating machine, switches connecting said regulating machine to the secondary of said motor, means for varying the voltage of said regulating machine whereby said voltage may be made to have certain predetermined ratios to the secondary voltage of said induction motor, and means responsive to said voltages for preventing said connecting switches from closing except when said predetermined ratios obtain.

2. In a system of control, the combination with an induction motor comprising a primary and a secondary, of a regulating machine, switches connecting said regulating machine to the secondary of said motor, means for varying the voltage of said regulating machine whereby said voltage may be made to have certain predetermined ratios to the secondary voltage of said induction motor, and a differential voltage relay responsive to said voltages for preventing said connecting switches from closing except when the ratio of said voltages exceeds a predetermined value.

3. In a system of control, the combination with an induction motor comprising a primary and a secondary, of a regulating machine, switches connecting said regulating machine to the secondary of said motor, means for changing the voltage of said regulating machine, and means responsive to the voltage of the regulating machine and the secondary voltage of the motor for preventing said connecting switches from closing when the voltage of the regulating machine is materially lower than the secondary voltage of the motor but permitting said connecting switches to close when the voltage of the regulating machine as compared with the secondary voltage of the motor is higher than a predetermined value.

4. In a system of control, the combination with an induction motor comprising a primary and a secondary, of a regulating machine, switches connecting said regulating machine to the secondary of said motor, means for changing the voltage of said regulating machine, and means responsive to the voltage of the regulating machine and the secondary voltage of the motor for preventing said connecting switches from closing except when the voltage of the regulating machine exceeds the secondary voltage of the motor.

5. The method of connecting a frequency changer to the secondary of an induction motor, which consists in adjusting the frequency-changer voltage to a value in excess of the secondary voltage of the induction motor, and then connecting said frequency changer to the secondary of said motor.

6. In a system of control, the combination with an induction motor, of a frequency changer provided with a rotor element and a phase-wound stator element, an adjustable transformer inserted between one of said elements and the line, switches connecting said two machines, and means responsive to the voltages of said frequency changer and said induction motor for preventing said switches from closing except when certain predetermined ratios of the voltage of said frequency changer to the secondary voltage of said induction motor exist.

7. In a system of control, the combination with an induction motor comprising a primary and a secondary, of a frequency changer connected to the secondary of said motor, means for changing the voltage of said frequency changer, switches connecting said two machines, means responsive to the voltages of said frequency changer and said induction motor for preventing said switches from closing except when certain predetermined ratios of the voltage of said frequency changer to the secondary voltages of said induction motor exist, and synchronizing apparatus preventing the operation of said connecting switches except when the two machines are substantially in synchronism with each other.

8. In a system of control, the combination with an induction motor comprising a primary and a secondary, of a regulating machine connected to the secondary of said motor, means adapted to increase the current flowing between the two machines, and means responsive to a predetermined minimum value of said current for energizing said first-mentioned means.

9. In a system of control, the combination with an induction motor comprising a primary and a secondary, of a frequency changer provided with a phase-wound stator element and a phase-wound rotor element, means connecting one of said elements to the secondary of said induction motor, resistance devices in series-circuit relation to the unconnected element of said frequency changer, means for controlling said resistance devices, and means responsive to a predetermined minimum value of the current flowing between the two machines for actuating said controlling means, whereby the value of said current may be maintained above said predetermined minimum value.

10. In a system of control, the combination with an induction motor comprising a primary and a secondary, of a frequency changer provided with a phase-wound stator element and a phase-wound rotor element, means connecting one of said elements to the secondary of said induction motor, resistance devices in series circuit relation to the unconnected element of said frequency changer, means for controlling said resistance devices, and means responsive to predetermined maximum and minimum values of the current flowing between the two machines for actuating said controlling means, whereby the current flow between said frequency changer and said induction motor may be regulated between predetermined maximum and minimum values.

11. In a system of control, the combination with an induction motor comprising a primary and a secondary, of a regulating machine, switches connecting said regulating machine to the secondary of said motor, the arrangement being such that there is a tendency for the current in the circuit between said two machines to temporarily assume excessive values upon the closure of said switches, an impedance device normally in series in said circuit, and means for producing the effect of shunting said impedance device after the closing of said switches when there is no longer any tendency for the current in said circuit to assume excessive values.

12. In a system of control, the combination with an induction motor comprising a primary and a secondary, of a regulating machine, switches connecting said regulating machine to the secondary of said motor, impedance devices in the circuit between said two machines, means for producing the effect of shunting said impedance devices, and interlocking means associated with said switches and said impedance-shunting means for preventing the latter from operating except when said switches are closed.

13. The method of passing from undersynchronous to over-synchronous speeds of a machine aggregate composed of an induction motor of the wound-secondary type and a frequency changer adapted to be connected to said motor secondary, which consists in temporarily inserting a current-limiting device between said motor secondary and said frequency changer and then establishing the connection between said machines for over synchronous operation.

14. In a system of control, the combination with an induction motor comprising a primary and a secondary, of a frequency changer connected to the secondary of said motor, means tending to change the voltage of said frequency changer, means tending to change the frequency of the same, and controller means associated with said voltage and frequency-changing means for first actuating said frequency changing means and then actuating said voltage-changing means during each step of the acceleration of said induction motor.

15. The method of accelerating an induction motor of the wound-secondary type, by means of a frequency changer connected to said motor secondary, which consists in taking steps tending to vary first the frequency and then the voltage of said frequency changer during each step of the acceleration of said induction motor.

16. The method of accelerating an induction motor of the wound-secondary type, by means of a frequency changer connected to said motor secondary, which consists in taking steps tending to decrease first the frequency and then the voltage of said frequency changer, during each step of the acceleration of said induction motor up to synchronous speed.

17. The method of accelerating an induction motor of the wound secondary type, by means of a frequency changer connected to said motor secondary, which consists in taking steps tending to increase first the frequency and then the voltage of said frequency changer, during each step of the acceleration of said induction motor above synchronous speed.

18. In a system of control, the combination with an induction motor comprising a primary and a secondary, of a frequency changer, means for connecting said frequency changer to said secondary and for accelerating said motor, said means being adapted to be connected to a source of energy, a switch for disconnecting said means from said source of energy, and a master-controller for said means, said controller being so associated with said disconnecting switch that, upon said source of energy being disconnected from said means, coasting operation of said induction motor may be employed, irrespective of the position of said master controller.

19. In a system of control, the combination with an induction motor comprising a primary and a secondary, of a frequency changer, means for connecting said frequency changer to the secondary of said motor and for accelerating said motor, said means being adapted to be connected to a source of energy, a switch for disconnecting said means from said source of energy, a master-controller for said means, said controller being so associated with said disconnecting switch that, upon said source of energy being disconnected from said means, coasting operation of said induction motor may be employed, irrespective of the position of said master controller, and means responsive to the voltage of the frequency changer and the secondary voltage of the motor for preventing said connecting means from operating to connect said machines except when a predetermined voltage ratio exists between said two machines.

20. In a system of control, the combination with an induction motor comprising a primary and a secondary, of a frequency changer, means for connecting said frequency changer to the secondary of said motor and for accelerating said motor, said means being adapted to be connected to a source of energy, a switch for disconnecting said means from said source of energy, a master-controller for said means, said controller being so associated with said disconnecting switch that, upon said source of energy being disconnected from said means, coasting operation of said induction motor may be employed, irrespective of the position of said master-controller, impedance devices in the circuit between said two machines, means for producing the effect of shunting said impedance devices, and interlocking means associated with the means for connecting the two machines and said impedance shunting means for preventing the latter from operating except when said connecting means are closed.

21. In a system of control, the combination with an induction motor comprising a primary and a secondary, of a frequency changer, means for connecting said frequency changer to the secondary of said motor and for accelerating said motor, said means being adapted to be connected to a source of energy, a switch for disconnecting said means from said source of energy, a master-controller for said means, said controller being so associated with said disconnecting switch that, upon said source of energy being disconnected from said means, coasting operation of said induction motor may be employed, irrespective of the position of said master-controller, and means for independently varying the voltage of said frequency changer whereby the ratio of said voltage to the secondary voltage of the motor may be brought within a predetermined range prior to the actuation of said means for connecting the two machines.

22. The method of accelerating an induction motor associated with a frequency changer which consists in taking steps tending to vary first the frequency and then the voltage of said frequency changer during each step of the acceleration of said induction motor.

In testimony whereof, we have hereunto subscribed our names this 22nd day of August, 1918.

RUDOLF E. HELLMUND.
HERBERT G. JUNGK.